(12) United States Patent  (10) Patent No.: US 9,296,050 B2
Cousineau  (45) Date of Patent: Mar. 29, 2016

(54) SELF-UNDERCUT EXPANSION ANCHOR INSERTION SYSTEM

(71) Applicant: Robert Cousineau, Ottawa (CA)

(72) Inventor: Robert Cousineau, Ottawa (CA)

( * ) Notice: Subject to any disclaimer, the term of this patent is extended or adjusted under 35 U.S.C. 154(b) by 308 days.

(21) Appl. No.: 14/033,101

(22) Filed: Sep. 20, 2013

(65) Prior Publication Data

US 2014/0079496 A1  Mar. 20, 2014

Related U.S. Application Data

(60) Provisional application No. 61/800,412, filed on Mar. 15, 2013.

(51) Int. Cl.
| | |
|---|---|
| *B23B 51/00* | (2006.01) |
| *F16B 13/06* | (2006.01) |
| *F16B 21/10* | (2006.01) |
| *F16B 13/00* | (2006.01) |

(52) U.S. Cl.
CPC ........... *B23B 51/0045* (2013.01); *F16B 13/002* (2013.01); *F16B 13/065* (2013.01); *F16B 21/10* (2013.01); *F16B 2013/007* (2013.01); *Y10T 408/5583* (2015.01)

(58) Field of Classification Search
CPC ........................... B23B 51/0045; F16B 13/065
USPC ................. 175/230; 405/259.4, 259.1, 258.1; 411/29, 30, 31
See application file for complete search history.

(56) References Cited

U.S. PATENT DOCUMENTS

| | | | | |
|---|---|---|---|---|
| 4,091,882 A | * | 5/1978 | Hashimoto | B23B 51/0045 175/286 |
| 4,518,290 A | * | 5/1985 | Frichmann | B23B 51/0045 405/259.6 |
| 4,702,654 A | * | 10/1987 | Frischmann | F16B 13/004 411/31 |
| 5,634,750 A | * | 6/1997 | Frischmann | F16B 1/0071 411/33 |
| 5,899,640 A | * | 5/1999 | Yeh | E02D 5/74 405/259.1 |
| 7,896,580 B2 | * | 3/2011 | Weaver | E02D 5/801 405/259.1 |
| 8,087,850 B2 | * | 1/2012 | Craig | E21D 21/0046 405/259.1 |
| 2008/0038068 A1 | * | 2/2008 | Craig | E21D 21/0046 405/259.3 |
| 2008/0260472 A1 | * | 10/2008 | Craig | E21D 21/0026 405/259.4 |
| 2009/0139772 A1 | * | 6/2009 | Miyanaga | B23B 51/0045 175/265 |
| 2011/0103896 A1 | * | 5/2011 | Horsch | E21D 21/0046 405/259.1 |
| 2015/0167715 A1 | * | 6/2015 | Hakenholt | F16B 13/065 166/381 |

* cited by examiner

*Primary Examiner* — Michael Safavi
(74) *Attorney, Agent, or Firm* — Loza & Loza, LLP; Razmig H. Messerian

(57) ABSTRACT

An undercut anchor system designed for effecting a drill hole and enlarging a lowermost end thereof for insertion and setting of an anchor therein, which utilizes interlocked components surrounding a rod body which can be used as a setting tool in a one-step process to position a bore hole sleeve and an anchor in position within the bore hole. An anchor is positioned on the rod body below the bore sleeve. A cutting tip protrudes from a lower end of the rod body. The cutting tip portion has an operational cutting radius greater than a radius of the rod body. In this manner, an anchor can be inserted within the pre-drilled hole, and, when the anchor has been flanged outwardly by conventional means within the hole, the flange portions of the anchor will rest within the enlarged area, thus securely retaining the anchor in place.

14 Claims, 24 Drawing Sheets

SELF-UNDERCUT EXPANSION ANCHOR INSERTION SYSTEM

CLAIM OF PRIORITY

The present application for patent claims priority to Canadian Patent Application No. 2,790,694 entitled "Self-Undercut Expansion Anchor Insertion System" filed Sep. 20, 2012, and U.S. Provisional Application No. 61/800,412 entitled "Self-Undercut Expansion Anchor Insertion System" filed Mar. 15, 2013, the entire disclosures of which are hereby expressly incorporated by reference herein.

BACKGROUND

1. Field

The present invention relates to a self-undercut expansion anchor system meant to be used for the insertion and setting of anchors, such as sleeve type and anchor bolt wedge type anchors into brittle materials such as concrete, stone, masonry and cementuous materials.

2. Background

Anchors are conventionally used in construction to attach various components of a building construction to an overhead ceiling or other structure. Such components to be attached can relate to, for example, services that provide plumbing, electrical, drainage, sprinkler system piping and drop ceilings. From these anchors, which are usually of the sleeve type or wedge type variety, all of the above services and ceilings are suspended or secured.

Conventionally, in setting anchors in concrete to suspend an awning, for example, a hole is pre-drilled in the surface to which the anchor is to be applied, and then the anchor is inserted into the pre-drilled hole. However, when setting such anchors in concrete it is not uncommon for such anchors to weaken and loosen over time, particularly in situations where cracking or chipping of the concrete around the pre-drilled hole has occurred.

Furthermore, studies have revealed that cracking can typically occur in the concrete element, and that such cracks can significantly impact the performance of anchors. Cracks can originate on a concrete beam or slab in a variety of ways, such as creep, temperature settlement of the support or foundation, thermal expansion and contraction stress overload, or from a natural disaster such as an earthquake or flood. In such situations, the situation can arise where, if one such concrete anchor fails and lets go, the remaining anchors, by virtue of the weight they additionally assume in light of such failure, can also similarly collapse and fail.

It has been found that enlarging the lower (interior) part of the pre-drilled hole can allow for the use of anchors in a more secure manner. It has further been found that providing a pre-drilled hole with an enlarged, conical lower end can be advantageously provided by a drill bit having enlarged cutters adjacent the tip, which is inserted into the pre-drilled hole, whereby the enlargement of the cutters is configured so that it can pass through the shaft of the pre-drilled hole to the upper end to be enlarged.

It would therefore be advantageous to have an improved self-undercut expansion anchor system meant for use in a pre-drilled hole for the insertion and setting of anchors into brittle materials such as concrete, stone, masonry and cementuous materials.

It would be further advantageous to have an improved self-undercut expansion anchor system for use in creating a drill hole and, at the same time, enlarging a lowermost end of a drill hole, wherein an anchor can later be positioned and securely retained within the enlarged area.

It would also be further advantageous to have an improved self-undercut expansion anchor system meant to be used for the later insertion and setting of anchors which utilizes interlocked components which can be used as a setting tool in a one-step process to position a bore hole sleeve and an anchor in position within the bore hole. To this end, the present invention effectively addresses this need.

SUMMARY

The present invention provides for a self-undercut expansion anchor system for effecting a drill hole and enlarging a lowermost end thereof for a later insertion and setting of an anchor therein.

In a first aspect, the present embodiment provides a substantially cylindrical rod body sized to fit into the drill hole; a drill connector portion having an upper end constructed and arranged to be operatively connected to a drill and a lower end disposed generally opposite said upper end, the lower end having a central opening on an underside thereof for receiving an insertion of an upper end of the rod body therein, an outer surface of the drill connector portion having a plurality of recessed areas thereon; an upper setting tool portion constructed and arranged to be operatively connected to the drill connector portion; a lower setting tool portion constructed and arranged to be operatively connected to the upper setting tool portion; a bore sleeve adapted to be positioned over the rod body and beneath the drill connector portion on the rod body, whereby the bore sleeve permits limited tilting movement of the rod body during a drilling process to enlarge the lowermost end of the drill hole; a cutting tip portion positioned to protrude from a lower end of the rod body, and positioned beneath the drill connector portion on the rod body, the cutting tip portion having an operational cutting radius greater than a radius of the rod body.

In a second aspect, the present embodiment provides an anchor constructed and arranged to be positioned on a threaded rod body for use in a self-undercut expansion anchor system, comprising at least two spreading lamellae constructed and arranged to flare radially outwardly when the anchor is set, a lower inside edge of the spreading lamellae being tapered outwardly, and a lower outside end of the spreading lamellae being tapered inwardly; and an annular recessed area positioned above the spreading lamellae constructed and arranged to permit, when the at least two spreading lamellae flare radially outwardly when the anchor is set, upper ends of the at least two spreading lamellae to reside therein, thus allowing for a greater outward expansion range of at least two spreading lamellae when the at least two spreading lamellae are forced radially outwardly.

BRIEF DESCRIPTION OF THE DRAWINGS

The embodiments of the present invention will now be described by reference to the following figures, in which identical reference numerals in different figures indicate identical elements.

DETAILED DESCRIPTION

The invention will be described for the purposes of illustration only in connection with certain embodiments. However, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention consists of an improved self-undercut expansion anchor system designed for insertion and use in enlarging an upper end of a pre-drilled hole for receiving and securely retaining an anchor therein. The self-undercut expansion anchor system will have a cutting end which can be rotatably mounted onto a conventional drill, or, alternatively, onto an elongated mounting assembly, which in turn is rotatably mounted to a conventional drill.

Figure 1:
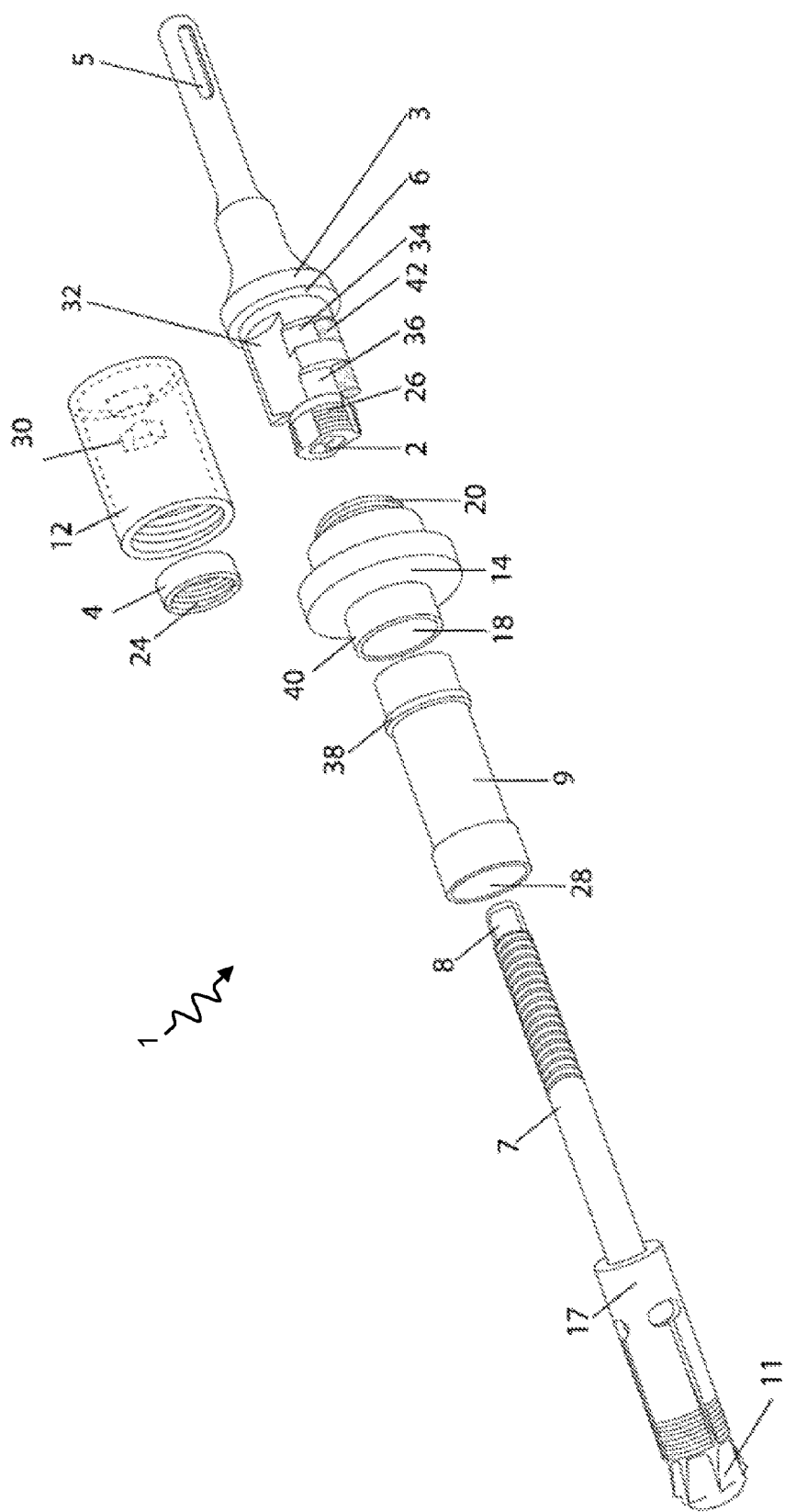
FIG. 1 is an exploded view of the components of an embodiment of the self-undercut expansion anchor system of the present invention.
Figure 2:
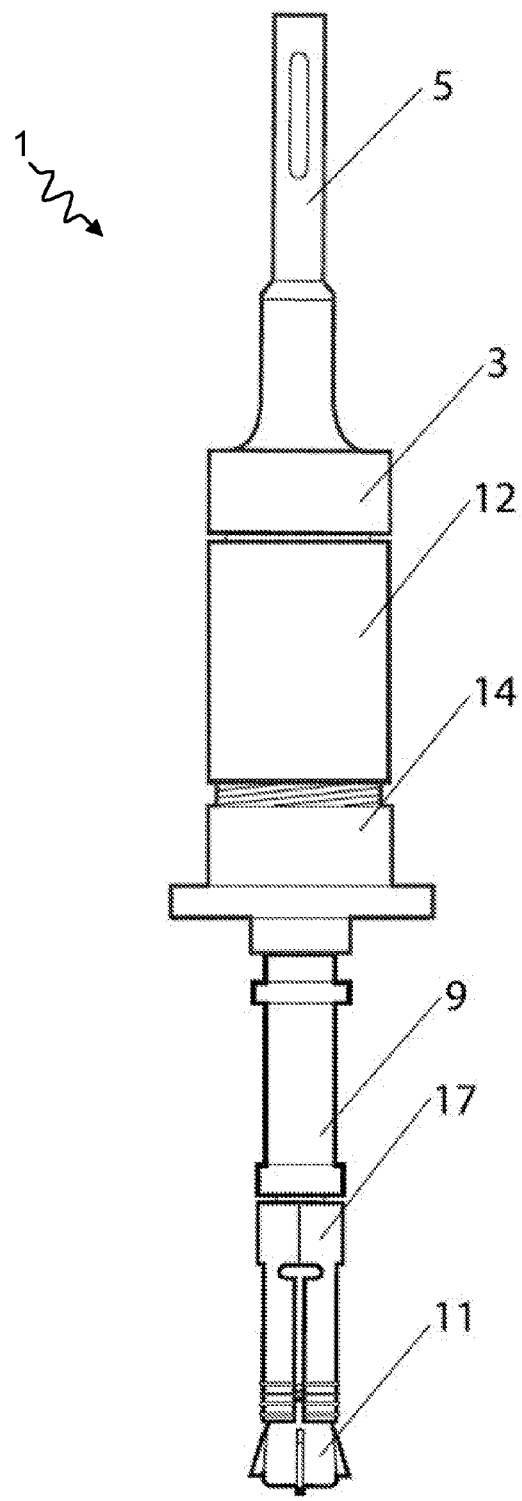
FIG. 2 is a side view of an embodiment of the self-undercut expansion anchor system of the present invention.

Referring to FIGS. 1 and 2, there is shown a self-undercut expansion anchor system shown generally at 1 in accordance with a first exemplary embodiment of the present invention, for use in the later insertion and setting of anchors into concrete, stone, masonry and cementuous materials. Preferably, the self-undercut expansion anchor system comprises a drill connector portion 3, a securing ring 4, upper setting tool portion 12 and lower setting tool portion 14, a threaded drill rod 7, a bore hole sleeve 9 and a cutting tip portion 11.

In a preferred embodiment, and as seen in FIGS. 1 and 2, the proximal upper end 5 of the drill connector portion 3 is constructed and arranged to be releasably secured to a drill (not shown) by way of a drill spindle (not shown). Preferably, the drill connector portion 3 will be made of a durable, machinable metal and a lower end 6 of the drill connector portion 3 is substantially cylindrical in shape.

With reference to FIG. 1, in assembling the self-undercut expansion anchor system, preferably, the upper setting tool portion 12 defines a substantially central opening 16 therethrough which permits the insertion of the upper setting tool portion 12 onto the drill connector portion 3. The interior of the upper setting tool portion 12 will preferably be threaded. Of course, the upper setting tool portion 12, once so placed, will substantially surround the lower end 6 of the drill connector portion 3. To lock and secure these portions in place, securing ring 4 is used. Securing ring 4 also defines a substantially central opening 24 therethrough and is threaded on an interior surface thereof, whereby, to secure the upper setting tool portion 12 in position, securing ring 4 is threaded onto a threaded lower end 26 of the drill connector portion 3. Then, the lower setting tool portion 14, which also defines a substantially central opening 18 therethrough, is inserted into the central opening 16 of the upper setting tool portion 12. In doing so, an upper end 20 of the lower setting tool portion 14 is threaded, and is placed in threaded engagement with the threads on the interior of the upper setting tool portion 12.

Figure 3:
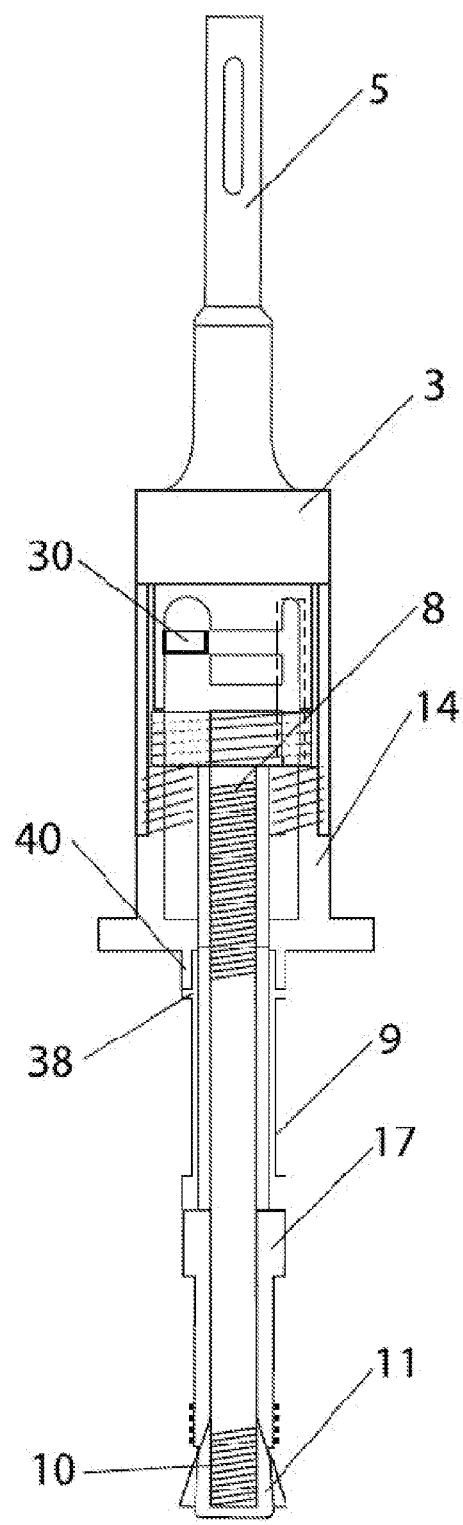
FIG. 3 is a cut away side view of an embodiment of the self-undercut expansion anchor system of the present invention shown in FIGS. 1 and 2.

An anchor 17 is then positioned on the threaded drill rod 7 to assume a position beneath that of the bore hole sleeve 9. Of course, it will also be understood that the anchor 17 and the bore hole sleeve 9 could be an integral, one-piece unit, rather than separate components. Finally, with reference to FIGS. 2 and 3, the lower end 10 of the threaded drill rod 7 receives cutting tip portion 11, which is threaded thereon, the cutting tip portion 11 having an internally threaded opening (not shown) on an upper surface thereof for threaded engagement with the rod 7. As seen in FIGS. 1-3, the cutting tip portion 11 has a plurality of cutters thereon.

The drill connector portion 3 has a substantially central opening 2 on the lower end 26 thereof, which permits the insertion of the upper end 8 of the threaded drill rod 7 into this central opening 2, as shown in FIG. 1. The connection of the upper end 8 of the threaded drill rod 7 to the central opening 2 of the drill connector portion 3 can be effected by a socket type quick release connection, or a threaded connection. The bore hole sleeve 9 is then inserted unto the threaded drill rod 7, to assume a position on the threaded drill rod 7 beneath that of the drill connector portion 3. Of course, the bore hole sleeve 9 has a central opening 28, the central opening permitting the bore sleeve to be positioned over the rod body.

With reference to FIG. 1, the drill connector portion 3 also preferably has machined thereon recessed areas, comprising a longitudinally extending groove channel 32, and a laterally extending first chamber 34 and second chamber 36 in connection with the groove channel.

Figure 4:
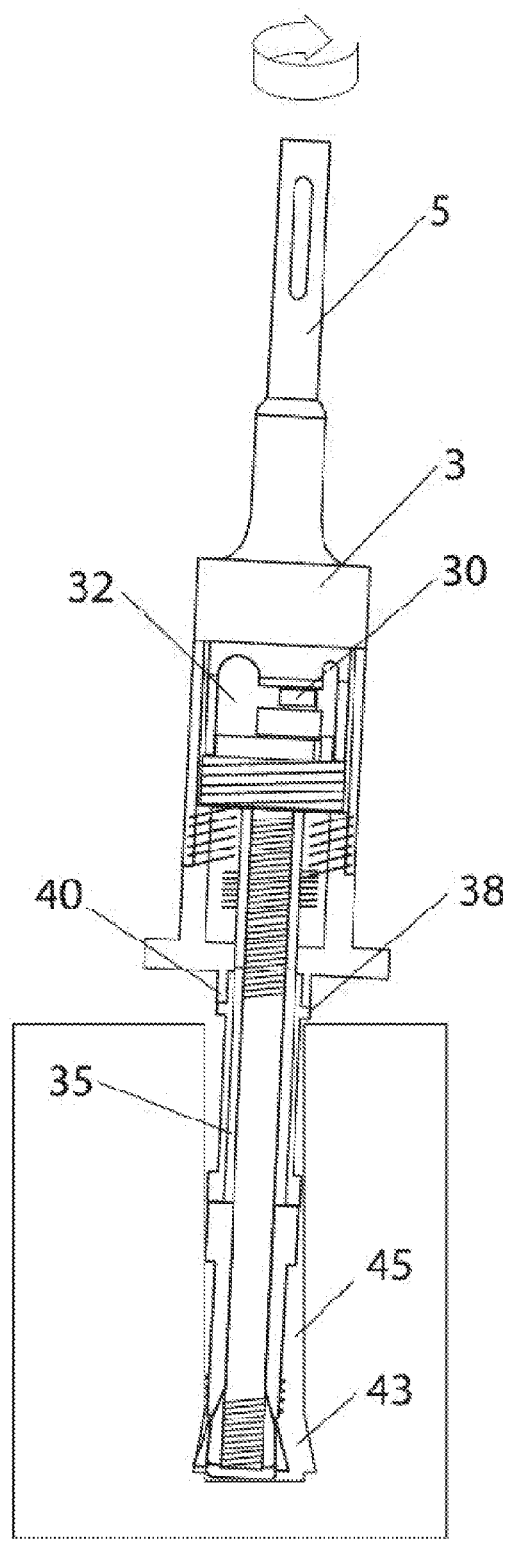
FIG. 4 is a side view of the self-undercut expansion anchor system of the present invention shown in FIGS. 1 to 3, in position within a drill hole and illustrating the tilting movement of the drill bit during a drilling process in enlarging the lowermost end of the drill hole, and illustrating the first setting position of the securing tab of the upper setting tool portion in position in the first chamber.

The upper setting tool portion 12 also preferably comprises a securing tab 30 on an upper interior surface thereof, whereby when the upper setting tool portion 12 is placed to substantially surround the lower end 6 of the drill connector portion 3, the securing tab 30 is positioned within groove channel 32, as can be seen in FIG. 3. Then the interlocked upper 12 and lower 14 setting tool portions can be pulled upwardly and rotated slightly in a clockwise direction, as seen in FIG. 4, whereby the securing tab 30 slides into the first chamber 34. This position then secures the components together, as a setting tool, whereby the bore hole sleeve 9 and the anchor 17 can be driven downwardly into the bore hole 45. Rubber insert 42, as seen in FIG. 1, is positioned on an upper interior surface of the drill connector portion 3, so as to eventually abut and prevent further sliding movement of securing tab 30 beyond the rubber insert 42, and to protect the securing tab from damage when the hammering/vibration type actions securing the anchor are effected during the anchor setting process. After the bore hole 45 has been drilled and the lowermost end 43 thereof enlarged, as seen in FIG. 6, the bore hole sleeve 9 pushes the anchor downwardly over the cutting tip portion 11 and then the anchor 17 is flanged outwardly in the widened expansion area created by the setting process, to be secured in the undercut.

Figure 5:
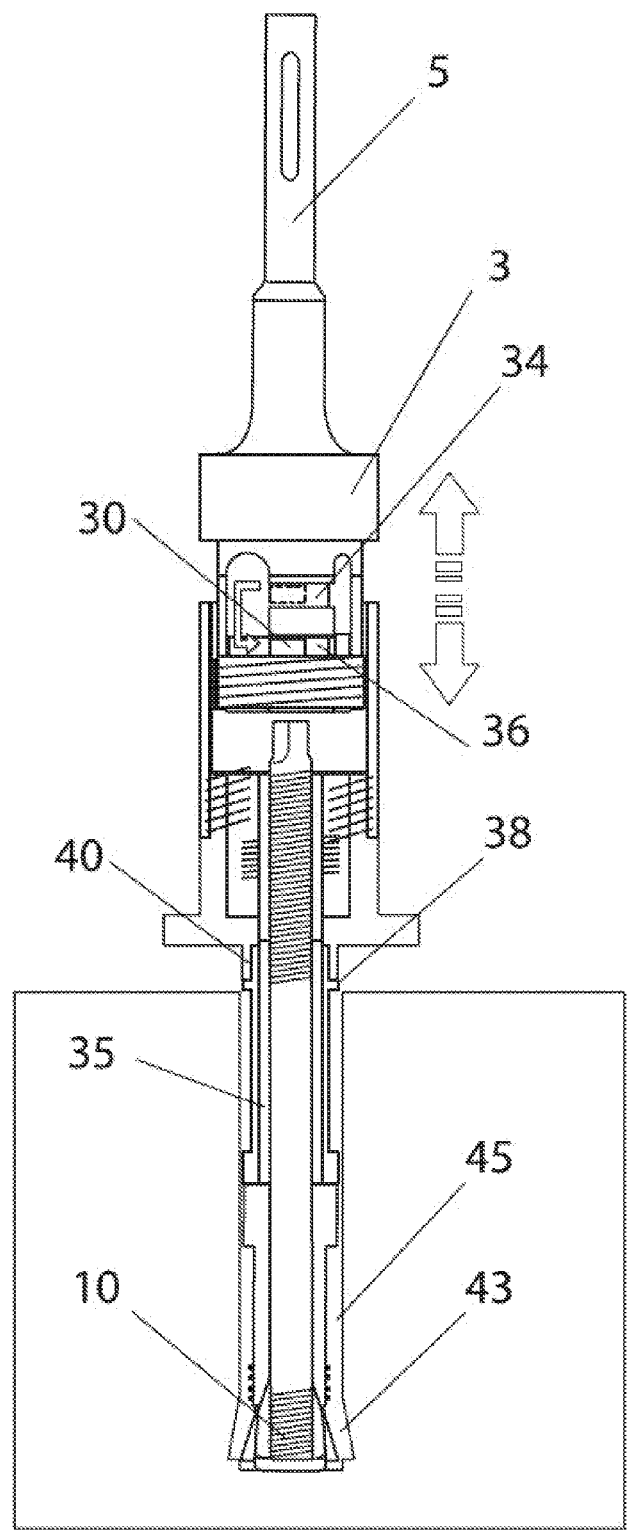
FIG. 5 is a side view of a further embodiment of the self-undercut expansion anchor system of the present invention shown in FIG. 4, in position within a drill hole and illustrating the tilting movement of the drill bit during a drilling process in enlarging the lowermost end of the drill hole, and illustrating the movement of the securing tab from the first setting position to the second setting position into the second chamber.
Figure 6:
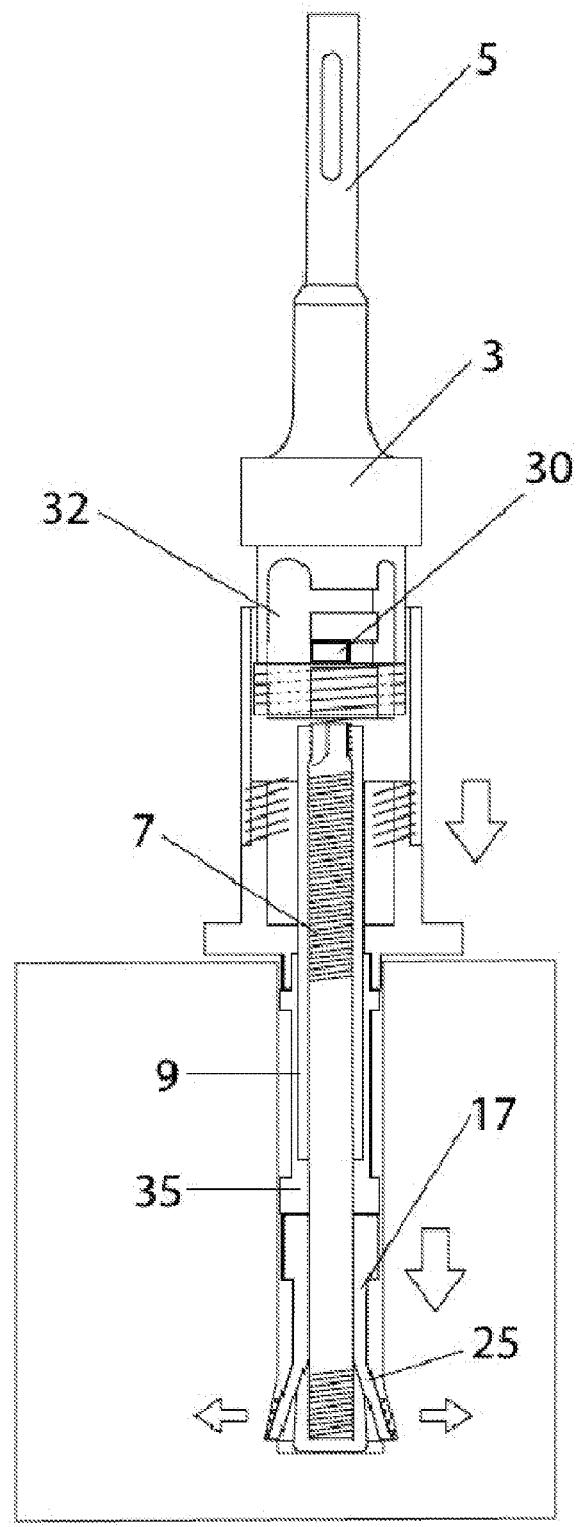
FIG. 6 is a side view of the self-undercut expansion anchor system of the present invention shown in FIG. 5, and illustrating the bore hole sleeve and the anchor having been positioned downwardly into the drill hole.

With reference to FIGS. 5 and 6, to ultimately disengage the setting tool components (ie: upper 12 and lower 14 setting tool portions) the interlocked upper 12 and lower 14 setting tool portions are first rotated slightly in a counterclockwise direction, so that the securing tab 30 enters groove channel 32, and, as these portions are pushed downwardly, the upper 12 and lower 14 setting tool portions are then rotated slightly in a clockwise direction, whereby the securing tab 30 slides into the first chamber 36 to achieve a disengagement position with the upper end 8 of the threaded drill rod 7. The drill connector portion 3, securing ring 4, upper setting tool portion 12 and lower setting tool portion 14 are then removed from engagement with the threaded drill rod 7 and can be individually disassembled.

Preferably, the threaded drill rod 7 will be made of a durable, machinable metal and is substantially cylindrical in shape. The threaded drill rod 7 is, preferably, of a one-piece construction that comprises, with reference to FIG. 3, an upper end 8 and a lower end 10 which are integrally connected to one another.

In operation to effect a drilling hole for the insertion of anchors therein, the drilling hole (shown as "45" in FIGS. 4 and 5) is first effected by a conventional drill bit, for example. Then the fully connected self-undercut expansion anchor system 1 is used to enlarge the drill hole 45 for the insertion of anchors. System 1 is connected to a drill (not shown), and the threaded drill rod 7, having cutting tip portion 11 threaded thereon, is inserted into the hole 45, wherein cutting tip portion 11 enlarges the hole 45 as the drilling process begins and the drill is pushed sideways to enlarge the hole 45. As this occurs, sidewalls of the hole 45 can now accommodate receiving the bore hole sleeve 9 and the anchor 17 therein. As can be seen in FIGS. 4 and 5, as the drilling process continues the bore hole sleeve 9 and anchor 17 assume positions within the hole 45. Of course, the cutting tip portion 11 has a greater outermost width than that of the threaded drill rod 7 whereby, when the drill rod 7 is inserted fully into a lowermost end 43 of the drill hole 45 and rotated during the drilling process (as shown in FIGS. 4 and 5), so as to effect a conical shape in the drill hole 45, the cutting tip portion 11 enlarges a circumference of the drill hole 45 at the lowermost end 43 thereof that is greater than the circumference of the remainder of the shaft of the drill hole 45.

With reference to FIGS. 4 and 5, when the threaded drill rod 7 is inserted further into the hole 45, the self-undercut expansion anchor system 1 can only be pushed downwardly to a certain point, as it is positioned within the pre-drilled hole, thus restricting further downward movement of the self-undercut expansion anchor system 1. Once the self-undercut expansion anchor system 1 is fully positioned into the hole 45, the self-undercut expansion anchor system 1 can operably be rotated (by the user rotating drill during drilling process), as shown in FIGS. 4 and 5, to provide for wider rotation of cutting tip portion 11 inside hole 45 with a view to enlarging a lowermost end 43 of the drill hole 45 to receive an anchor.

Further, with reference to FIGS. 4 and 5, an interior surface of the bore hole sleeve 9 will preferably not be in contact with the rod body 7, thus allowing for rotational tilting of the rod body 7 within the bore sleeve 9 during the drilling process. In essence, interior portions of the central opening (not shown) of the bore hole sleeve 9 avoid abutment with the rod body 7, so as to permit limited tilting movement of the rod body 7 during a drilling process to enlarge the lowermost end 43 of the drill hole 45. FIG. 2B also illustrates a further embodiment of the bore hole sleeve 9. In this embodiment, the bore sleeve 9 is engaged in threaded engagement with the rod body 7, and the rod body 7, and further comprises an abutment portion 35. The abutment portion 35 preferably has a width greater than that of a remainder of the bore sleeve 9. Thus, when the rod body 7 within the bore sleeve 9 is tilted during the drilling process (as shown in FIG. 5), the abutment portion 35 contacts the inside walls of the drill hole 45, whereby the amount of tilting force required to create a wider opening at the bottom of the hole 45, or the conical shape thereof, is increased. And, by virtue of the bore sleeve 9 having a width less than that of the bore hole, and preferably by less than half that of the drill hole 45, space is provided whereby tilting movement during drilling can occur, until, of course, the abutment portion 35 contacts side walls of the drill hole 45, as see in FIG. 4.

Figure 7:
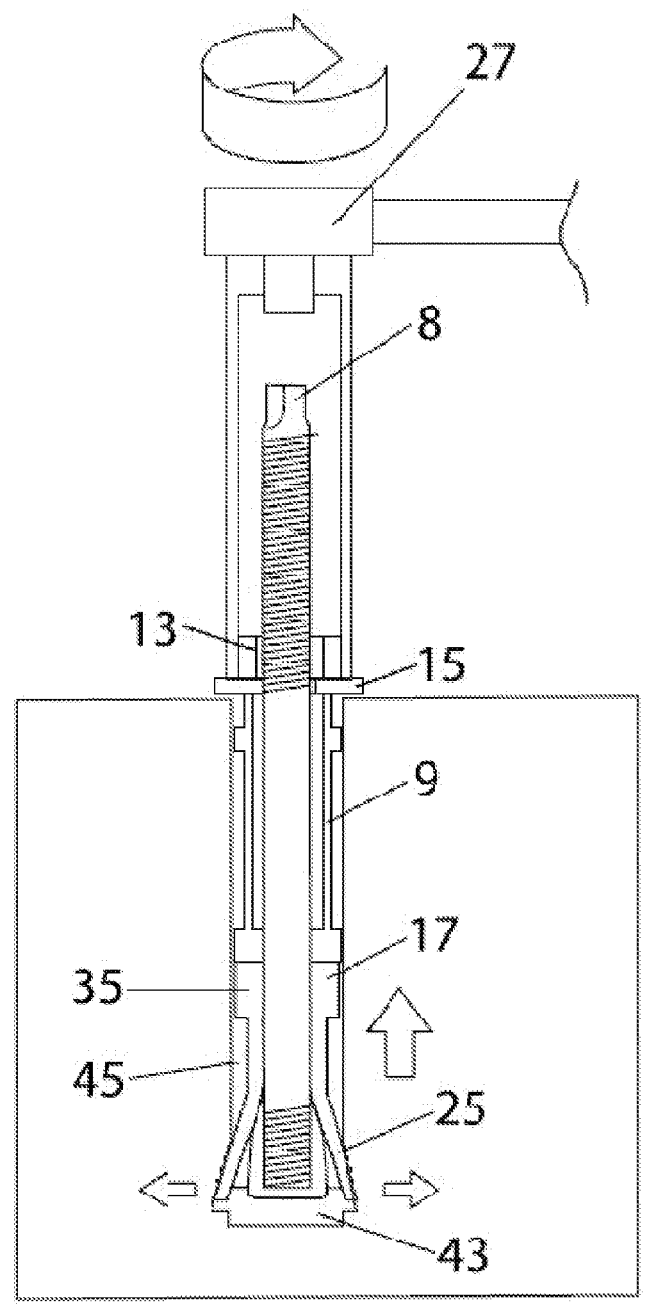
FIG. 7 is a side view of the self-undercut expansion anchor system of the present invention shown in FIG. 6, whereby the upper setting tool portion and lower setting tool portion have been disengaged from the threaded rod, and illustrating a wrench tool now being used to lift the threaded rod upwardly and force the anchor to flange outwardly into the undercut of the drill hole.
Figure 8:
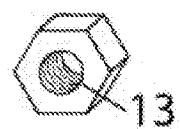
FIG. 8 is a perspective view of the securing bolt found in FIG. 7, according to one embodiment of the present invention.
Figure 9:
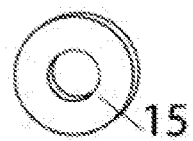
FIG. 9 is a perspective view of the washer found in FIG. 7, according to one embodiment of the present invention.

Further, an upper portion 38 of the bore sleeve 9 will preferably have a width greater than that of a remainder of the bore sleeve 9, so as to receive thereon a flange portion 40 of the lower setting tool portion 14 when the interlocked individual components are connected together, as can be seen in FIGS. 3, 4 and 5. With reference to FIGS. 7-9, it can be seen that the drill connector portion 3, securing ring 4, upper setting tool portion 12 and lower setting tool portion 14 have been removed from engagement with the threaded drill rod 7, leaving the bore hole sleeve 9 and the anchor 17 in position within the bore hole 45.

Once the lowermost end 43 of the drill hole 45 has been enlarged to receive an anchor 17, the upper end 8 of the threaded drill rod 7 is then disengaged from the substantially central opening 2 on the drill connector portion 3, and threaded securing bolt 13 and washer 15 are positioned over and surrounding the upper end 8 of the threaded drill rod 7. A wrench tool 27 (as shown in FIG. 7) is then positioned over and surrounding the securing bolt 13, the wrench tool 27 being used to rotate the threaded drill rod 7 upwardly within the drill hole 45, which forces the flange portions 25 of anchor 17, which have flanged outwardly, to secure into the undercut within drill hole 45, as shown in FIGS. 7-9, thus securely retaining the anchor 17 in place. As an example, a socket type of wrench tool 27 could be utilized.

Figure 10:
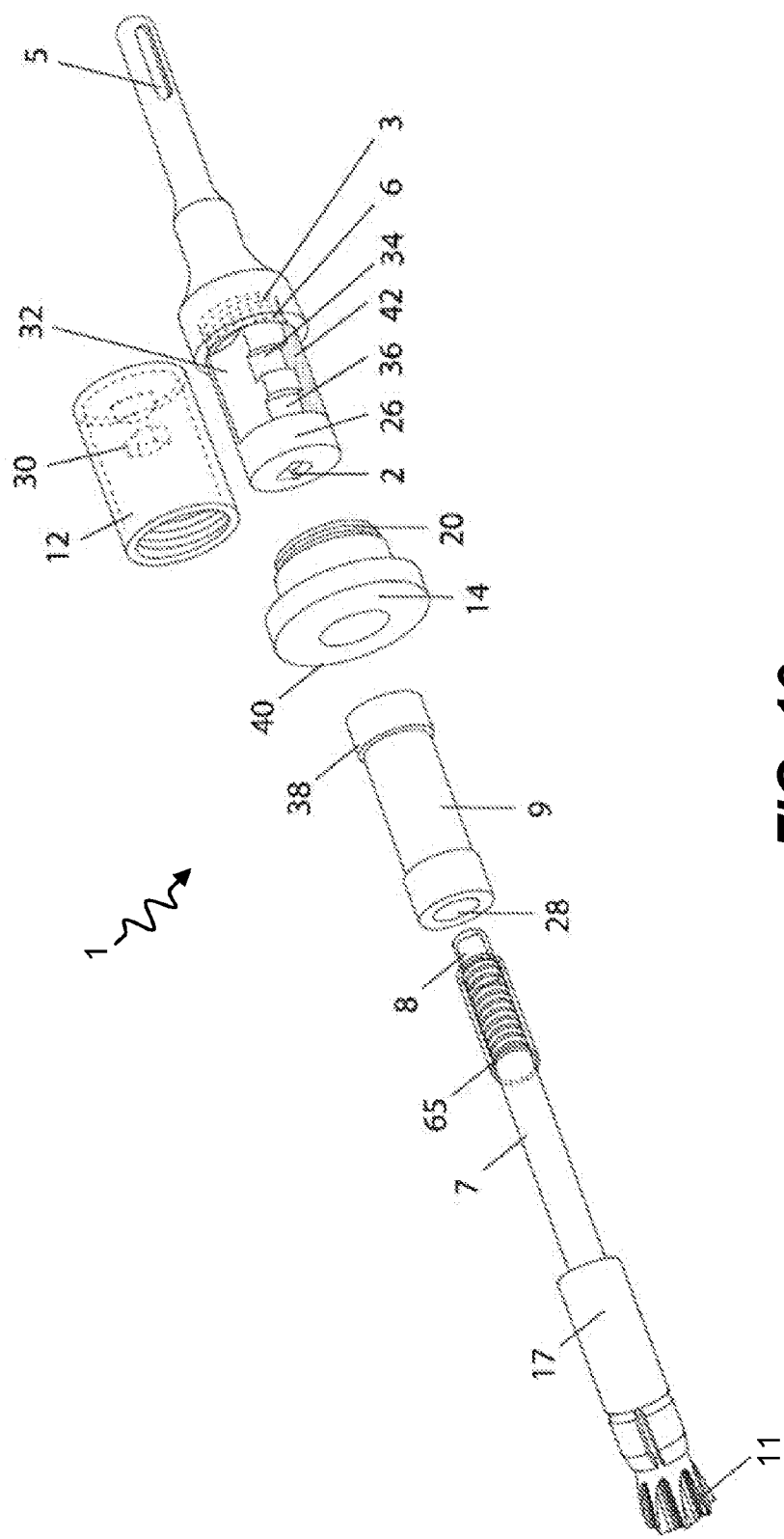
FIG. 10 is an exploded view of the components of a further embodiment of the self-undercut expansion anchor system of the present invention shown in FIG. 1.
Figure 11:
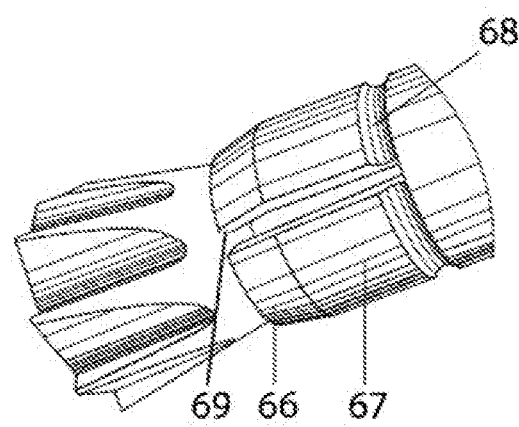
FIG. 11 is an enlarged view of the cutting tip portion and spreading lamellae found in FIG. 10, according to one embodiment of the present invention.
Figure 12:
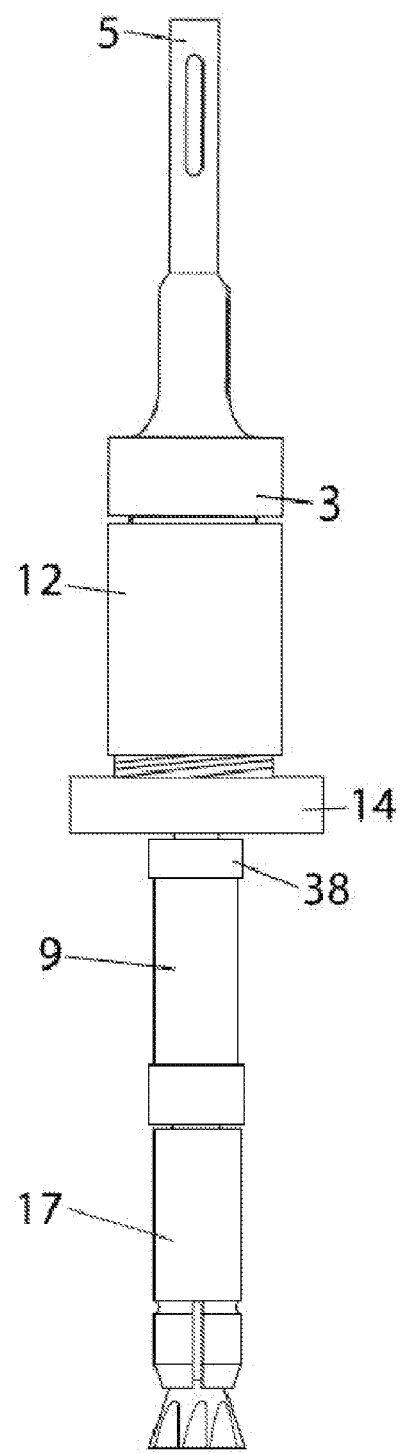
FIG. 12 is a side view of the embodiment of the self-undercut expansion anchor system of the present invention shown in FIG. 10.
Figure 13:
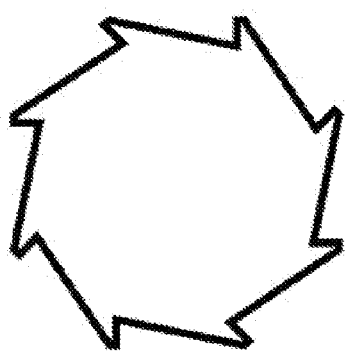
FIG. 13 is a bottom view of the cutting top portion found in FIG. 12, according to one embodiment of the present invention.
Figure 14:
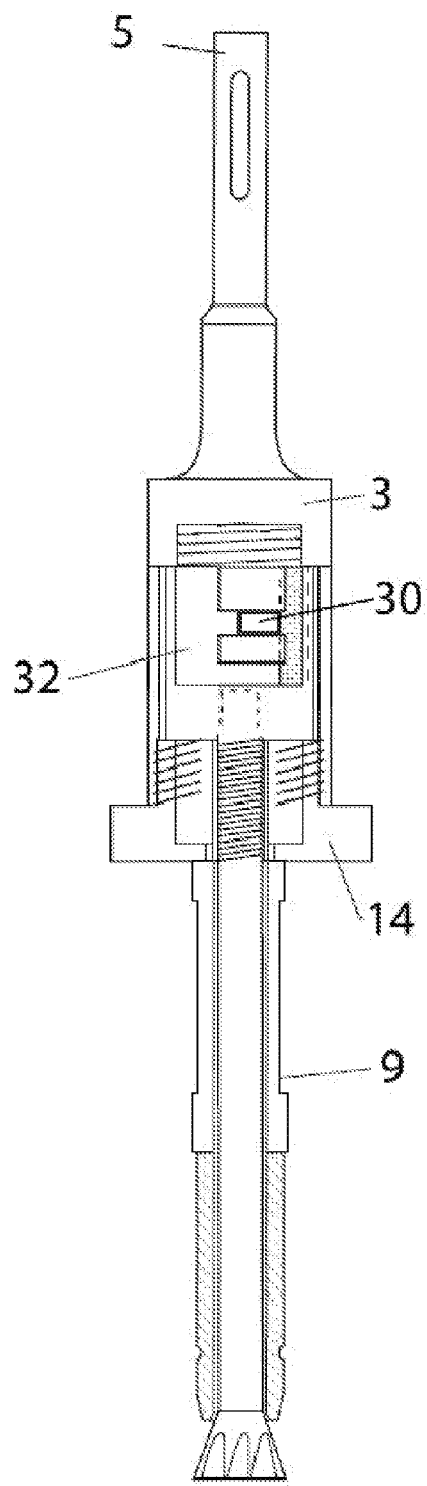
FIG. 14 is a cut away side view of the embodiment of the self-undercut expansion anchor system of the present invention shown in FIGS. 10 and 12.
Figure 15:
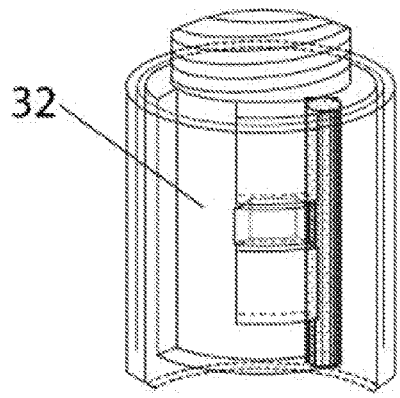
FIG. 15 is an enlarged cut away view of the securing tab and groove channel of the upper setting tool portion found in FIG. 14, according to one embodiment of the present invention.
Figure 16:
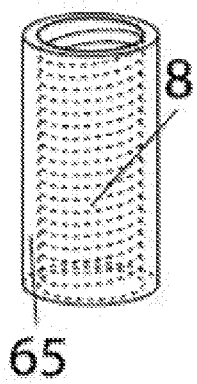
FIG. 16 is a perspective cut away view of the upper end of the threaded drill rod found in FIG. 14, according to one embodiment of the present invention.
Figure 17:
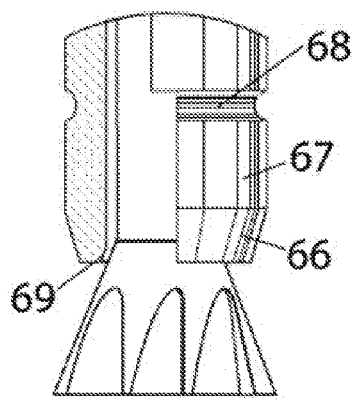
FIG. 17 is an enlarged semi cross-sectional view of the cutting tip portion and spreading lamellae found in FIG. 14, according to one embodiment of the present invention.

FIGS. 10 and 11 illustrate an exploded view of the components of a further embodiment of the self-undercut expansion anchor system of the present invention shown in FIG. 1. Many of the components are the same. There is shown a self-undercut expansion anchor system shown generally at 1 in accordance with this exemplary embodiment of the present invention, for use in the later insertion and setting of anchors into concrete, stone, masonry and cementuous materials. Preferably, this exemplary embodiment comprises a drill connector portion 3, upper setting tool portion 12 and lower setting tool portion 14, a threaded drill rod 7, a bore hole sleeve 9 and a cutting tip portion 11.

An anchor 17 is then positioned on the threaded drill rod 7 to assume a position beneath that of the bore hole sleeve 9. Of course, it will also be understood that the anchor 17 and the bore hole sleeve 9 could be an integral, one-piece unit, rather than separate components. Finally, with reference to FIGS. 10 and 11, the lower end 10 of the threaded drill rod 7 receives cutting tip portion 11, which is threaded thereon, the cutting tip portion 11 having an internally threaded opening (not shown) on an upper surface thereof for threaded engagement with the rod 7. As seen in any one of FIGS. 10, 12, 14, 18, 20, 21, 23, and 25, the cutting tip portion 11 has a plurality of cutters thereon.

A worker skilled in the relevant art would appreciate that the cutting tip portion 11 and the threaded drill rod 7 could be one single piece instead of having a threaded connection. A worker skilled in the relevant art would further appreciate that the anchor 17 and the bore hole sleeve 9 could also be on single piece, without departing from the scope of the invention.

Figure 18:
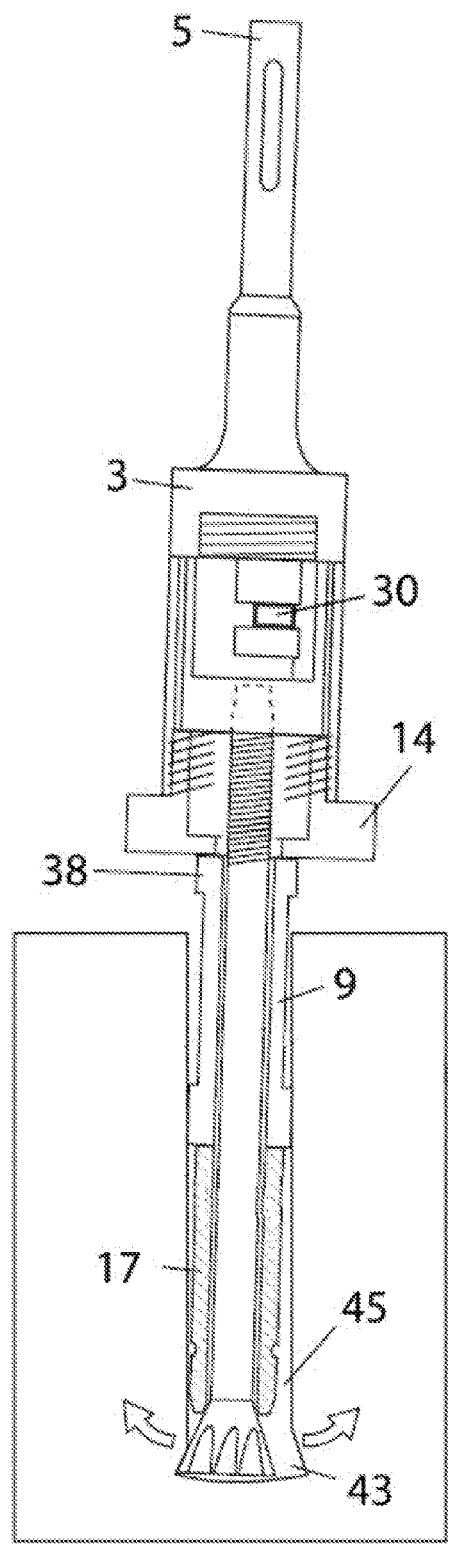
FIG. 18 is a cut away side view of the embodiment of the self-undercut expansion anchor system of the present invention shown in FIGS. 10 and 12, in position within a drill hole and illustrating the tilting movement of the drill bit during a drilling process in enlarging the lowermost end of the drill hole, and illustrating the securing tab in the first setting lock chamber position and the tilting movement of the anchor at the lower end of the drill hole to create the undercut.
Figure 19:
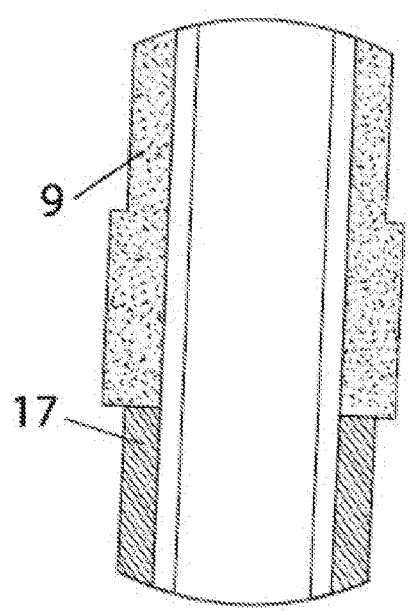
FIG. 19 is an enlarged cross-sectional view of the abutment of the bore hole sleeve against the bore hole during tilting as shown in FIG. 18, according to one embodiment of the present invention.
Figure 20:
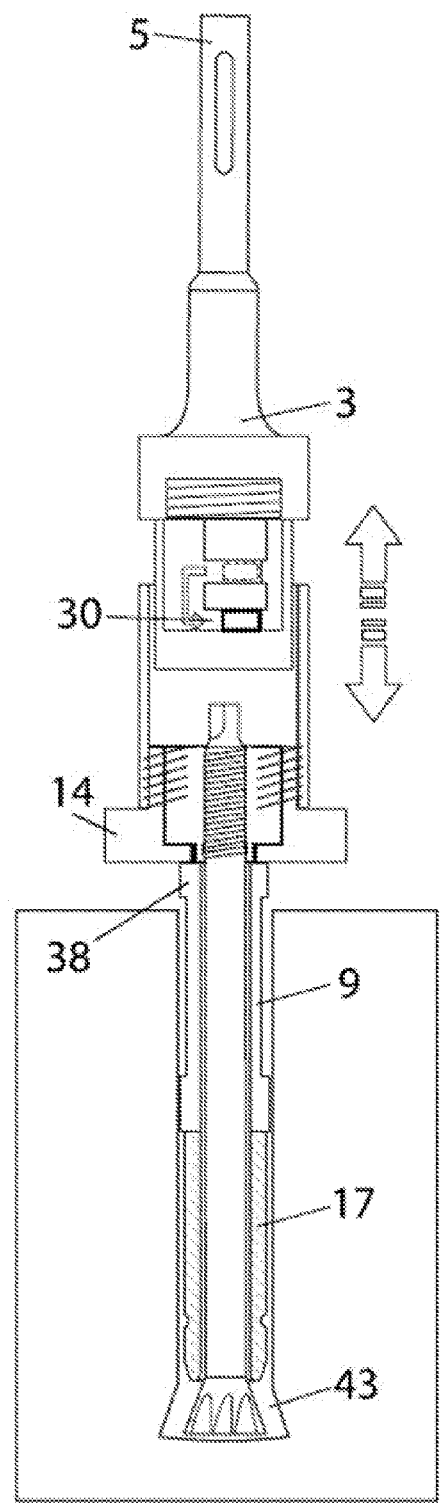
FIG. 20 is a cut away side view of the embodiment of the self-undercut expansion anchor system of the present invention shown in FIGS. 10, 12, 14, and 18, and illustrating the movement of the securing tab from the first setting lock chamber position (tilting movement) to the setting position in the second chamber.
Figure 21:
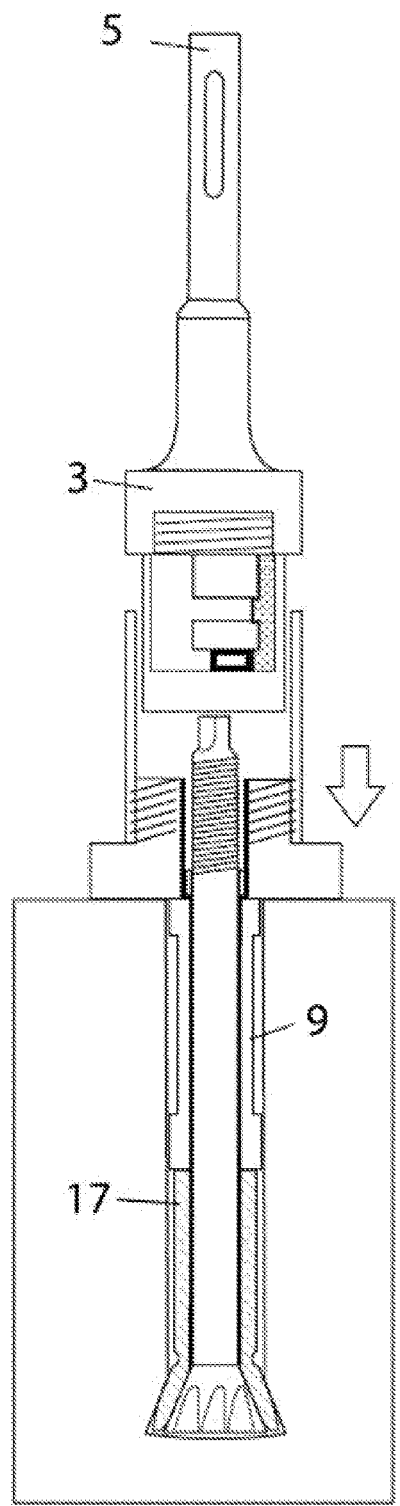
FIG. 21 is a cut away side view of the embodiment of the self-undercut expansion anchor system of the present invention shown in FIGS. 10, 12, 14, and 18, and illustrating the bore hole sleeve and the anchor having been positioned downwardly into the drill hole.
Figure 22:
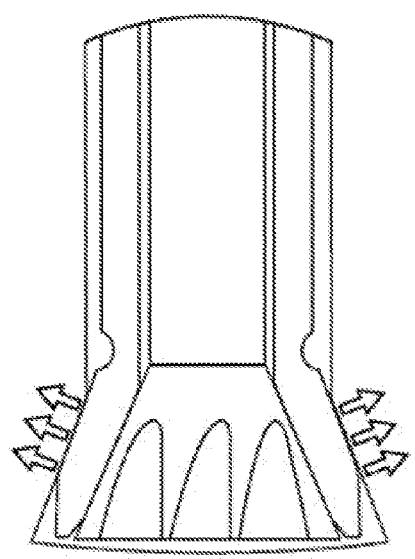
FIG. 22 is an enlarged cross-sectional view of the spreading lamellae spreading over the cutting tip portion as shown in FIG. 21, according to one embodiment of the present invention.
Figure 23:
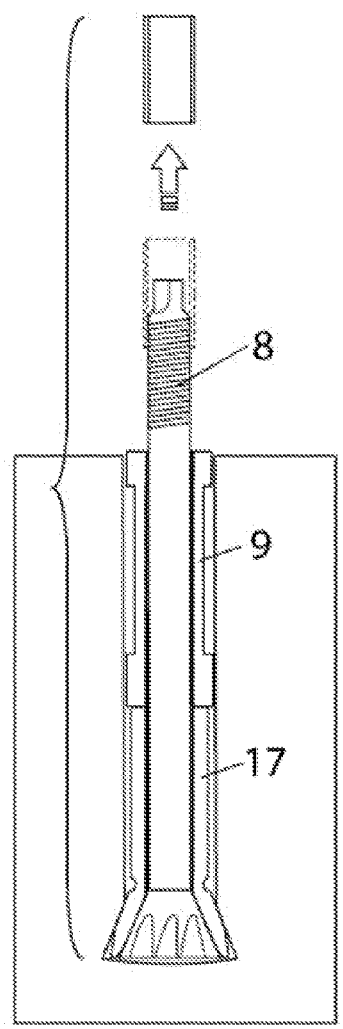
FIG. 23 is a side view of the drill rod having the protective sleeve fitted over it.
Figure 24:
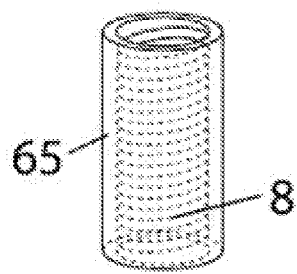
FIG. 24 is a perspective cut away view of the upper end of the threaded drill rod found in FIG. 23, according to one embodiment of the present invention.

In an exemplary embodiment, and as shown in FIG. 10, a protective sleeve 65 is positioned over the upper end 8 of the threaded drill rod 7, as a means to protect the threaded drill rod 7 when tilting the anchor 17 with the lower setting tool portion 14 to create the undercut shown in FIGS. 18 and 19.

Figure 25:
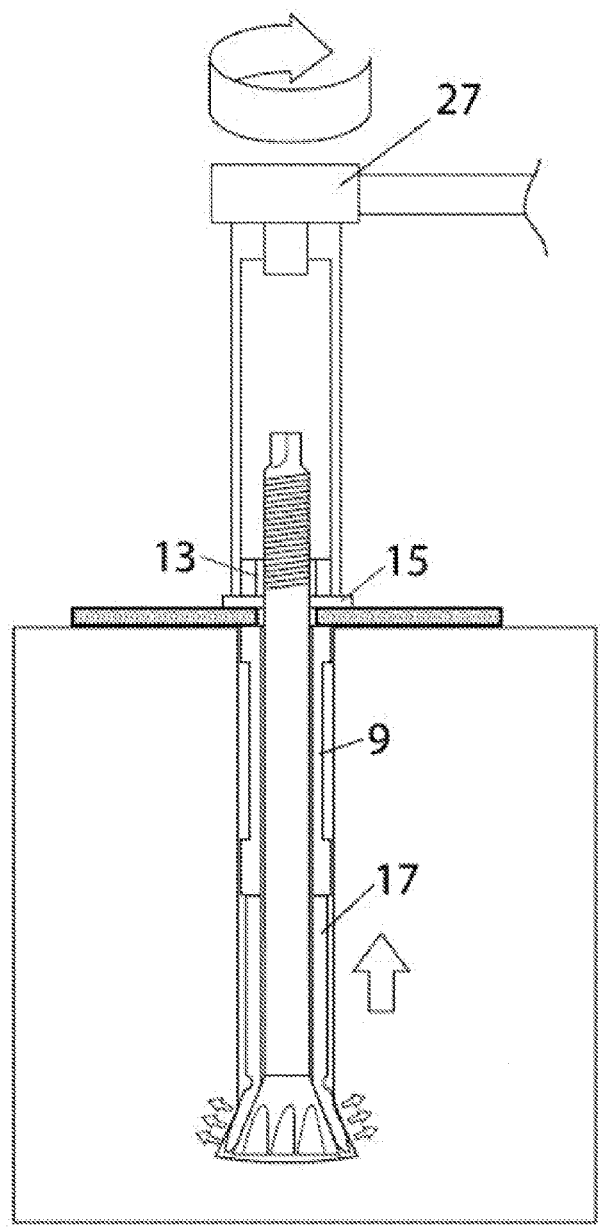
FIG. 25 is a side view of the self-undercut expansion anchor system of the present invention shown in FIG. 23, whereby the upper setting tool portion and lower setting tool portion have been disengaged from the threaded rod, and illustrating a wrench tool now being used to lift the threaded rod upwardly and force the anchor to flange outwardly into the undercut of the drill hole.
Figure 26:
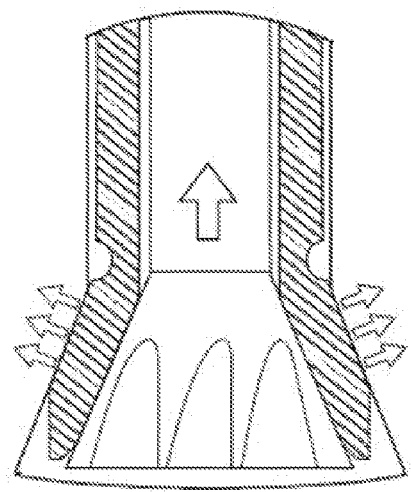
FIG. 26 is an enlarged cross-sectional view of the spreading lamellae spread over the cutting tip portion as shown in FIG. 25, according to one embodiment of the present invention.
Figure 27:
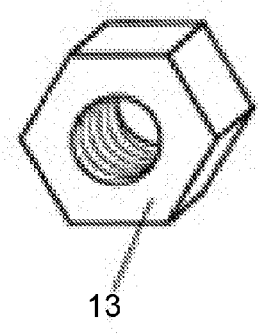
FIG. 27 is a perspective view of the securing bolt found in FIG. 25, according to one embodiment of the present invention.
Figure 28:
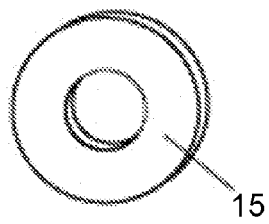
FIG. 28 is a perspective view of the washer found in FIG. 25, according to one embodiment of the present invention.
Figure 29:
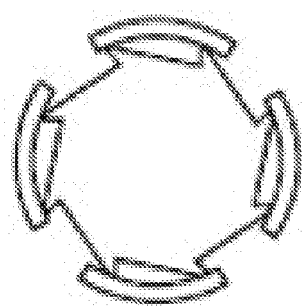
FIG. 29 is a bottom view of the spreading lamellae over the cutting tip portion as found in FIG. 25, according to one embodiment of the present invention.

In a further exemplary embodiment, as shown in FIGS. 14, 15, 16, and 17, the anchor 17 comprises spreading lamellae 67, that, of course spread outwardly when the anchor 17 is set by the wrench tool 27, which is used to lift the threaded rod 7 upwardly and force the spreading lamellae 67 of the anchor 17 to flange outwardly into the undercut of the drill hole as can be seen in FIGS. 25, 26, and 29. There will generally be at least two spreading lamellae 67, though this figure can of course be varied. The anchor 17 further comprises an annular recessed area 68, which is positioned above the spreading lamellae 67 on the anchor 17. A lower outside end 66 of the anchor 17 also will be tapered inwardly, which, in combination with an inside slope edge 69 of anchor 17 being tapered outwardly, permits the anchor 17 to be positioned above the cutting tip portion 11. By virtue of this arrangement of positioning the anchor 17 higher above the cutting tip portion 11, and in having the lower end 66 and inside slope edge 69 tapered, this allows for a greater effect in creating the bottom of the drill hole 45, whereby a maximum tilting cutting action can be created to achieve a greater wider undercut, as it brings the pressure point of the anchor 17 higher above the cutting tip portion 11. It also allows the anchor 17 to have a much wider surface to rest above the cutting tip portion 11, and thus increases the pull strength without damaging the cutting tip portion 11 by an extreme pull force when setting the anchor 17 with the wrench tool 27. Further, by virtue of having the lower end 66 and inside slope edge 69 tapered, the anchor thus possesses a narrower end (ie: inner & outer tapered angle) thus making it easier to insert the anchor 17. Furthermore, by virtue of the annular recessed area 68, positioned above the spreading lamellae 67 on the anchor 17, when the spreading lamellae 67 are forced outwardly when setting the anchor 17 with the wrench tool 27, upper ends of the spreading lamellae 67 can fit within the annular recessed area 68, thus allowing for a greater outward expansion range of the spreading lamellae 67 when the spreading lamellae 67 are forced outwardly.

Figure 30:
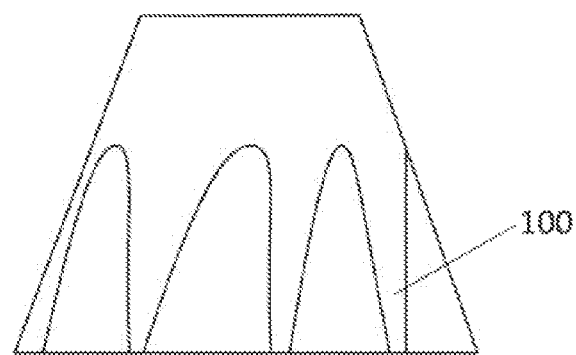
FIG. 30 is a side view of the cutting tip portion of the self-undercut expansion anchor system, according to one embodiment of the present invention.
Figure 31:
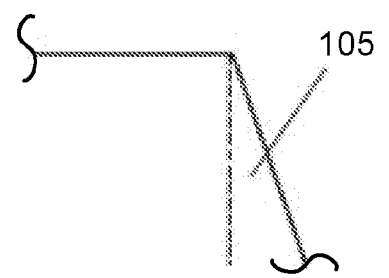
FIG. 31 is an enlarged view of an upper portion of the cutting tip portion of the self-undercut expansion anchor system, according to one embodiment of the present invention.

With reference to FIGS. 30 and 31 and according to an exemplary embodiment of the present device, the cutting tip portion 11 is shown in greater detail. In said exemplary embodiment, the lower diameter of the cutters 100 of the cutting tip portion 11 is wider than the upper diameter of said cutters 100. Thus, the lower diameter is closer to the bore walls than the upper diameter to maximize the cutting width. In doing so, the cutting tip portion 11 widens and maximizes the area of the undercut and enables the spreading lamellae (not shown) of the anchor (not shown) to flange outwards up to an ideal position. Said ideal position is shown in FIGS. 25, 26, and 29, where the lamellae of the anchor are nearly but not completely flush against the lower diameter of the cutting tip portion 11. The resulting drill hole (not shown) can vary in size, but will ideally be as close as possible to the corresponding lower diameter of the cutters 100. Generally speaking, the lower diameter of the cutters 100 will always be greater than the upper diameter of the cutters 100, such that an undercut is created. An angle 105 is also shown, said angle 105 representing the offset between the upper portion of the cutting tip portion 11 and the lower diameter of the cutters 100. Said angle 105 has been found to be optimal at a range between 8°-12° degrees. A worker skilled in the art can appreciate that range of angle 105 is optimized such that the upper diameter of the cutters 100 will begin creating a small but meaningful undercut incrementally until the lower diameter of the cutters 100 which will create the widest undercut.

Figure 32:
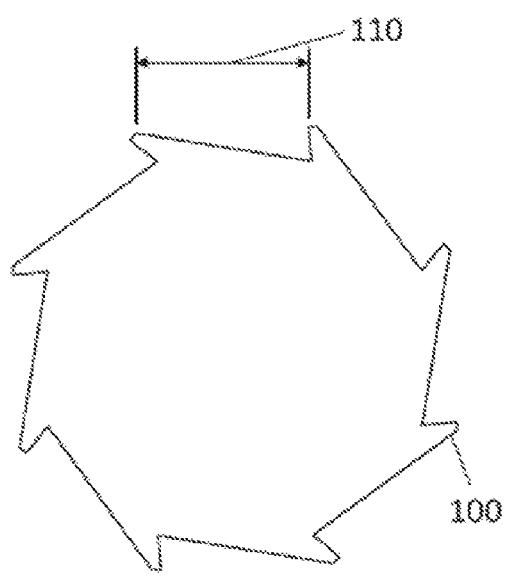
FIG. 32 is a bottom view of the cutting tip portion of the self-undercut expansion anchor system, according to one embodiment of the present invention.

With reference to FIG. 32 and according to an exemplary embodiment of the present device, the ideal distance 110 between two cutters 100 is 0.270 inches. This distance 110 creates the best possible performance with eight cutters 100; however, a worker skilled in the art would appreciate that the distance 110 between two cutters 100 would be shorter if there were more than eight cutters 100, or longer if there were less than eight cutters 100. A worker skilled in the art would further appreciate that the less cutters 100 are present, the wider the undercut may be but the more said cutters 100 get used. Conversely, the more cutters 100 that are present, the narrower the undercut will be but the more said cutters will remain sharp. As such, there is an ideal number of cutters that can be utilized, which preliminarily ranges between 2 and 15 cutters.

It will be apparent to those skilled in this art that various modifications and variations may be made to the embodiments disclosed herein, consistent with the present invention, without departing from the spirit and scope of the present invention. Other embodiments consistent with the present invention will become apparent from consideration of the specification and the practice of the invention disclosed therein. Accordingly, the specification and the embodiments are to be considered exemplary only, with a true scope and spirit of the invention being disclosed by the following claims.

What is claimed is:

1. A self-undercut expansion anchor system for effecting a drill hole and enlarging a lowermost end thereof for a later insertion and setting of an anchor therein, the assembly comprising:
    a substantially cylindrical rod body sized to fit into the drill hole;
    a drill connector portion having an upper end constructed and arranged to be operatively connected to a drill and a lower end disposed generally opposite said upper end, the lower end having a central opening on an underside thereof for receiving an insertion of an upper end of the rod body therein, an outer surface of the drill connector portion having a plurality of recessed areas thereon;
    an upper setting tool portion constructed and arranged to be operatively connected to the drill connector portion;
    a lower setting tool portion constructed and arranged to be operatively connected to the upper setting tool portion;
    a bore sleeve adapted to be positioned over the rod body and beneath the drill connector portion on the rod body, whereby the bore sleeve permits limited tilting movement of the rod body during a drilling process to enlarge the lowermost end of the drill hole; and
    a cutting tip portion positioned to protrude from a lower end of the rod body, and positioned beneath the drill connector portion on the rod body, the cutting tip portion having an operational cutting radius greater than a radius of the rod body.

2. The system of claim 1, wherein the cutting tip portion is engaged in threaded engagement with the rod body.

3. The system of claim 1, wherein the anchor is positioned on the rod body, the anchor being positioned between the cutting tip portion and the bore sleeve on the rod body.

4. The system of claim 1, wherein the bore sleeve has a central opening, the central opening permitting the bore sleeve to be positioned over the rod body.

5. The system of claim 4, wherein interior portions of the central opening of the bore sleeve avoid abutment with the rod body, so as to permit limited tilting movement of the rod body during the drilling process to enlarge the lowermost end of the drill hole.

6. The system of claim 1, wherein the bore sleeve further comprises an abutment portion, the abutment portion having a width greater than that of a remainder of the bore sleeve.

7. The system of claim 6, wherein the bore sleeve has a width less than that of the drill hole.

8. The system of claim 1, wherein the cutting tip portion has a plurality of cutters thereon.

9. The system of claim 1, wherein the plurality of recessed areas further comprise a longitudinally extending groove channel and a laterally extending first chamber and second chamber in connection with the groove channel.

10. The system of claim 1, further comprising a securing ring constructed and arranged to be operatively connected to the lower end of the drill connector portion, so as to prevent disengagement of the upper setting tool portion from the drill connector portion.

11. The system of claim 9, wherein the upper setting tool portion further comprises a securing tab on an upper interior surface thereof, the securing tab being constructed and arranged for slidable movement within the groove channel, the first chamber and the second chamber, and wherein the drill connector portion further comprises an abutment insert for inhibiting movement of the securing tab beyond the abutment insert.

12. The system of claim 11, wherein the securing tab is constructed and arranged for selective movement between a locked position within the first chamber and an unlocked position in the second chamber.

13. The system of claim 1, further comprising a protective sleeve positioned over the upper end of the rod body.

14. The system of claim 1, wherein the anchor and the bore sleeve are an integral, one-piece unit.

* * * * *